Patented Jan. 2, 1951

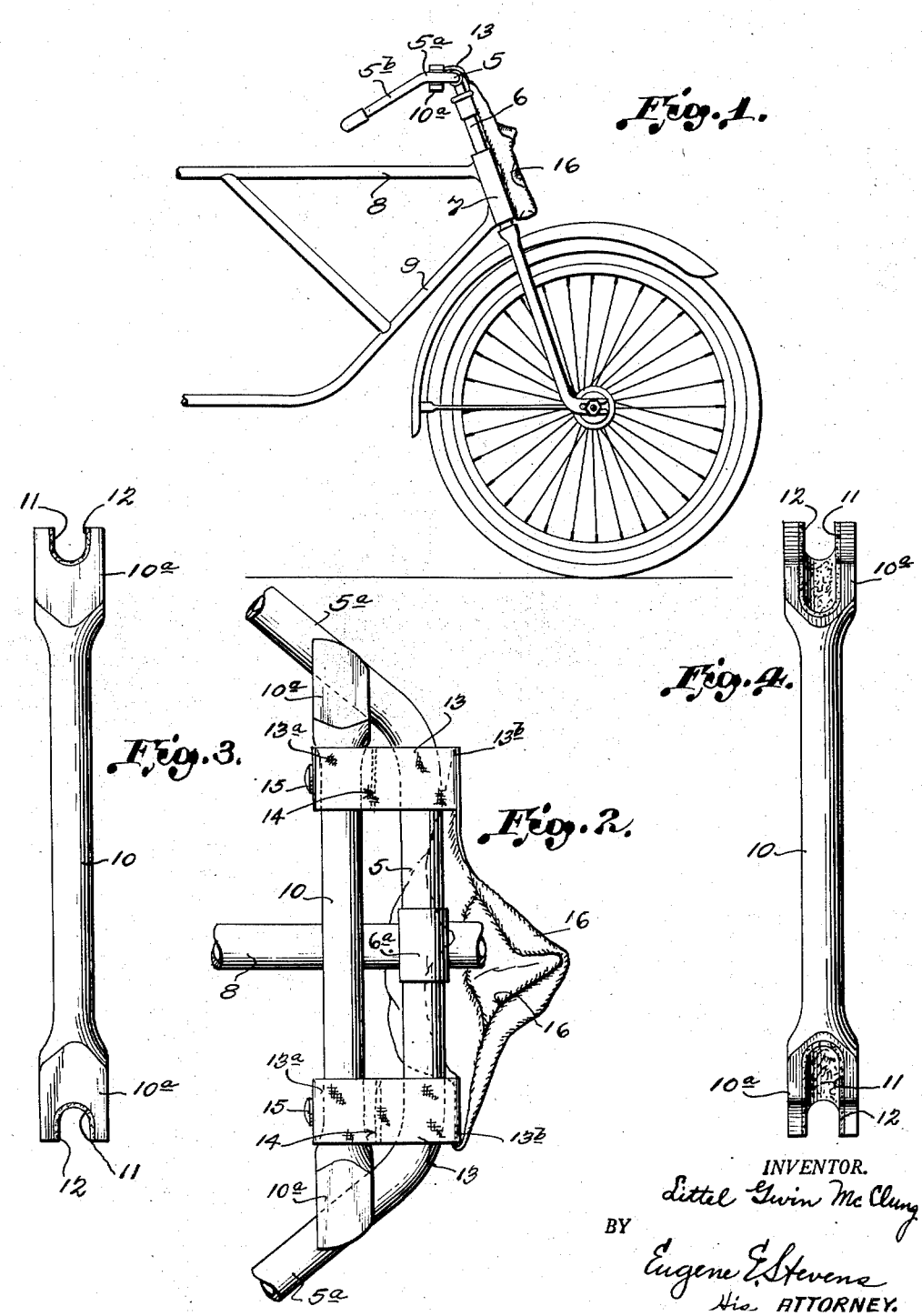

2,536,071

UNITED STATES PATENT OFFICE 2,536,071

BICYCLE ARTICLE CARRIER

Littell Gwin McClung, Florence, Ala.

Application May 7, 1947, Serial No. 746,507

4 Claims. (Cl. 224—36)

My invention relates to article carriers for attachment to bicycles, and has particular reference to such as are adapted to be retained in place on the handle bars.

Briefly and generally stated, the invention has for one of its primary objects to provide a device of the character referred to which incorporates novel means whereby retaining engagement with the handle bars is, or may be, effected solely by the weight of the articles carried in a bag or receptacle portion of the device.

Another object of the invention is to provide a handle bar engaging rigid member having wedge like seats at its ends for frictionally engaging the rearwardly inclined portions of the handle bars, there being a receptacle member adapted to be disposed forwardly of the handle bars and steering column and said receptacle acting through connections with the rigid member for tending to retain the wedge-like portions in seated engagement with the handle bar.

Additionally, the invention contemplates a device of this kind incorporating a handle bar engaging member which is rigid and tends to maintain laterally spread, a receptacle which may be of fabric or like material and which is carried thereby.

Other objects and advantages of the invention will be apparent as the description proceeds, reference being had to the accompanying drawing which illustrates a now preferred form of my inventive concept.

It is to be understood, of course, that the invention is susceptible of other mechanical expression within the scope and spirit of the subject matter claimed hereinafter.

In the drawing, wherein the same reference characters have been used to designate the same parts in all views, Figure 1 is a side elevation of the front portion of a bicycle having my novel article carrier mounted on the handle bars thereof;

Fig. 2 is a top plan view illustrating fragmentarily a portion of the handle bars of a bicycle and illustrating the application of my invention thereto;

Fig. 3 is a rear elevational view of the handle bar engaging member which is incorporated in the invention; and Fig. 4 is a front elevational view of the handle bar engaging member.

Referring to the drawing by reference characters, numeral 5 denotes the straight central portion of the handle bars of a bicycle, same being carried by the horizontal bearing 6a at the upper end of the steering column 6 which is journalled as usual in the bearing 7 carried by the adjacent ends of frame members 8, 9.

In carrying out the invention, I provide the bar 10 which serves as the handle bar engaging element. It may be made of wood, metal, plastic or any preferred material, and its enlarged end portions 10a have outwardly diverging grooves 11 therein. The angle of divergence of the grooves 11 may be varied according to the type of handle bars to which the device is to be secured. However, the grooves 11, as illustrated, are designed for application to the so-called "steer horn" type of handle bars which embody the rearwardly inclined virtually straight portions 5a.

The grooves 11 in the enlarged end portions 10a of the bar 10 are preferably lined with felt, rubber, or other shock absorbing material 12, which will be adhesively or otherwise secured in place. To enhance the wedging action grip of the bar and grooves 11 on the handle bar sections 5a, the material 12 will preferably be of rubber or other friction material.

The grooved terminal portions 10a of the bar 10 are illustrated as being square or rectangular in cross-section but this is largely a matter of choice. It is also desirable to round the terminals of the portions 10a so as to avoid projecting of same beyond the outer portions of the handle bar sections 5a.

Inwardly of each of the enlarged terminal portions 10a of the bar 10, I dispose a preferably flexible strap 13, the bar being inserted through a loop 13a of each strap. This loop is defined by two rows of cross stitching 14 as illustrated in Fig. 2, and the loops 13a will, of course, be of sufficient size to admit of insertion of the enlarged bar ends 10a. The outer ends of the straps 13 are indicated at 13b and are secured to opposite walls of the mouth 16a of a bag or other receptacle 16. The advantage of securing one outer loop end 13b to the outer wall of bag 16 and the other loop end 13 to the inner wall thereof, is that in this way the straps 13 tend to keep the mouth 16a of the bag closed.

Preferably ornamental screws or large headed tacks 15 are availed of for securing the looped straps 13 to the bar 15 just inwardly of the end enlargements 10a thereof. It will be observed that the enlargements 10a of the bar tend to resist any tendency for the strap members 13 to slide outwardly.

Although the bag 16 illustrated is of the collapsible fabric type, it is to be understood that it may take the form of a stiff receptacle, such as a satchel, wire basket, or the like. When a collapsible bag such as 16 is used, it will be obvious that the bar 10, acting through the associated straps 13 serves to maintain the bag 16 properly spread at the mouth end so that articles can be readily deposited in the mouth 16a.

A further important feature of the invention is the relationship of the bag 16 to the steering column 6 and its bearing 7, it being noted that the bag lies against said parts. By reason of this relationship, the steering column 6 and its bearing 7 by frictional engagement serves to resist sideward swinging of bag 16 as when the bicycle is turned sharply in one direction or the other.

It will be apparent as previously intimated that the weight of the bag, acting through the straps 16 serves as one means for retaining the grooved bar ends in engagement with the handle bar portion 5a. However, of course, as previously intimated, there is a distinct wedging action of grooves 11 against the diverging straight portions 5a of the handle bars. Obviously, the use of a rubber or other frictional lining 12 for the grooves 11, increases the frictional grip of same on the bar portions 5a.

It will be appreciated that an outstanding point, from the point of view of convenience in use, is that the device can be simply pulled off of the handle bar sections 5a whenever not required, there being no fastening elements of any kind employed.

Another feature of the invention is that the bar 10 forms a convenient carrying handle for the device after it has been removed from the handle bars of a bicycle.

Having thus described my invention, what I claim is:

1. An article carrier comprising a receptacle, a transversely disposed rigid member adapted for use as a carrying handle and spaced from said receptacle, flexible means carrying said receptacle and rigid member, said rigid member having enlarged terminal portions, and said terminal portions having grooves therein and adapted to receive opposed rearwardly extending handle bar portions.

2. The structure of claim 1, characterized by said grooves diverging outwardly to provide wedge-like seats.

3. An article carrier for bicycles and the like having handle bars providing opposed rearwardly extending portions, a vertical post and a bearing carrying the same; said article carrier comprising a receptacle, a cross-bar spaced from said receptacle and disposed transversely thereof, flexible means connecting said receptacle and cross-bar, said cross-bar having a grooved terminal portion in each end and adapted to frictionally engage and seat the opposed rearwardly extending handle bar portions, said receptacle being adapted to be supported and frictionally engaged by said handle bar post and its bearing whereby to resist transverse movement of the receptacle as the bicycle is turned one way or the other, said receptacle being a flexible bag having a mouth opening adjacent its upper end, and one of said flexible means engaging the forward wall of the bag forwardly of the mouth while the other flexible means engages the rear mouth portion of the bag.

4. An article carrier for bicycles and the like having handle bars providing opposed rearwardly extending portions, a vertical post and a bearing carrying the same; said article carrier comprising a receptacle, a cross-bar spaced from said receptacle and disposed transversely thereof, flexible means connecting said receptacle and cross-bar, said cross-bar having a grooved terminal portion in each end and adapted to frictionally engage and seat the opposed rearwardly extending handle bar portions, said receptacle being adapted to be supported and frictionally engaged by said handle bar post and its bearing whereby to resist transverse movement of the receptacle as the bicycle is turned one way or the other, and the end grooves of said bar having rear walls approaching the end of the bar in the direction of the back of the bar whereby to receive diagonally extending handle bar portions and substantially contiguously engaging the same.

LITTELL GWIN McCLUNG.

REFERENCES CITED

The following references are of record in the file of this patent:

UNITED STATES PATENTS

| Number | Name | Date |
|---|---|---|
| 398,945 | Credlebaugh | Mar. 5, 1889 |
| 599,120 | Coolidge | Feb. 15, 1898 |
| 610,251 | Wall | Sept. 6, 1898 |